(12) United States Patent
Roth et al.

(10) Patent No.: US 6,760,185 B1
(45) Date of Patent: Jul. 6, 2004

(54) METHOD AND SYSTEM FOR GENERATING SERVO POSITION ERROR SIGNALS

(75) Inventors: Maxim Roth, Cupertino, CA (US); Benjamin G. Ryu, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 96 days.

(21) Appl. No.: 09/617,481

(22) Filed: Jul. 17, 2000

(51) Int. Cl.[7] .............................................. G11B 5/596
(52) U.S. Cl. .............................. 360/77.08; 360/78.14; 360/48
(58) Field of Search ........................... 360/77.08, 78.14, 360/48, 49, 77.04

(56) References Cited

U.S. PATENT DOCUMENTS 5,596,463 A * 1/1997 Hashimoto .................. 360/121
6,175,465 B1 * 1/2001 Kawachi et al. .......... 360/77.02
6,369,974 B1 * 4/2002 Asgari et al. .................. 360/75
6,429,995 B1 * 8/2002 Dobbek et al. .......... 360/77.08

* cited by examiner

Primary Examiner—David Hudspeth
Assistant Examiner—K. Wong

(57) ABSTRACT

A servo method and system for generating a position error signal in a disk drive including a magnetic data storage disk rotating relative to a base, a data transducer assembly positioned at concentric data tracks by a rotary actuator referenced to the base and controlled by a digital servo system, the data transducer assembly having a magnetoresistive (MR) read element, the digital servo system employing multiple servo bursts in servo sectors embedded within the data tracks. During servo track positioning/following for each target head position relative to a track, a plurality of the servo bursts are selected, and combinations of the burst amplitudes of the selected servo bursts are obtained. A substantially continuous position error signal (C_PES) is generated based on the combinations of the burst amplitudes, indicating radial position of the read head relative to the target position.

33 Claims, 13 Drawing Sheets

METHOD AND SYSTEM FOR GENERATING SERVO POSITION ERROR SIGNALS

FIELD OF THE INVENTION

The present invention relates to servo control systems, and more particularly, to head positioning in servo control systems for disk drives.

BACKGROUND OF THE INVENTION

Magnetic hard disk drives typically store user data blocks in data sectors arranged within concentric data tracks. The sectors typically include the user data and also include certain overhead information needed by the hard disk drive for head positioning and for locating user data within each data track. The overhead information is typically included within a servo region or sector header located ahead of each user data portion or sector. The servo sector may be recorded at the same frequency as the data sector, or the servo sector may be recorded at one data rate over the entire radial extent of the data storage surface. The user data sectors are typically recorded at data rates based on track radius which enables user data rates to be optimized at the particular radius. Radial zones of adjacent data tracks are frequently employed as a practical compromise between optimum data transfer rate and implementation complexity.

The servo information may include information for adjustment of read channel gain elements and block framing elements. The servo information may also include a track number field which is Gray-coded and used for coarse positioning during track seeking and settling operations, a sector number field for circumferential location information within the track. The servo information also typically includes track centering information, such as a plurality of radially and circumferentially offset bursts providing track centerline and quadrature reference information.

Many of the new disk drive systems with high track densities employ a head with a magneto-resistive (MR) read element formed in or over a thin film inductive write element. By using magneto-resistive sensing, a greater electrical output signal is achieved for a given flux change intensity from the recording surface. While MR readers provide greater sensitivity, they also typically operate non-linearly with response to absolute position over the flux transition. This non-linearity means that the MR read element may put out one signal level at a given off-track position in one radial direction of the storage disk, and another signal level at the same given off-track position in the opposite radial direction.

The read/write element separation in MR heads requires new off-track performance requirements in a disk drive. Furthermore, the MR read element is typically significantly narrower than the inductive write element in order to achieve better margins for tracking errors, for example. However, a narrow MR read element poses poor signal-to-noise ratio, and position error signal (PES) discontinuity and non-linearity problems for the servo system.

Many disk drives use both digital track number and multiple analog servo burst signals from disks to decide the position of a head using an MR read element. Depending on the head position within a track, the servo system decodes different pairs of servo bursts to determine the fractional track position. When switching from one pair of bursts to another, the servo system frequently perceives discontinuities in the head position due to the non-linearity of the MR head as a position transducer. These discontinuities become a serious servo problem when the destination/target head position/location is on one of said switching boundaries (switch points).

Some existing solutions have attempted to address this problem by printing different servo burst formats, or by utilizing different ways of decoding the positioning information, however, without solving the PES discontinuity and non-linearity problems at target head positions where servo burst switching occurs. What has been lacking in the prior approach has been a servo head positioning method and system that provides a substantially linear PES signal. There is also need for such a method and system to solve the tracking problems at the burst witching boundaries.

BRIEF SUMMARY OF THE INVENTION

The present invention satisfies these needs. In one embodiment, the present invention provides a servo method and system for generating a position error signal in a disk drive including a magnetic data storage disk rotating relative to a base, a data transducer assembly positioned at concentric data tracks by a rotary actuator referenced to the base and controlled by a digital servo system, the data transducer assembly having a magnetoresistive (MR) read element, the digital servo system employing multiple servo bursts in servo sectors embedded within the data tracks. During servo track positioning/following for each target head position relative to a track, a plurality of the servo bursts are selected, and combinations of the burst amplitudes of the selected servo bursts are obtained. A substantially continuous position error signal (C_PES) is generated based on said combinations of the burst amplitudes, indicating radial position of the read head relative to the target position.

Selecting servo bursts includes selecting at least two pairs of servo bursts, and for each selected pair of servo bursts obtaining at least one combination of the burst amplitudes of the selected servo burst pair. Selecting servo bursts can be in accordance with predetermined burst phase switch points fixed in relation to radial position of the read head relative to a track. Obtaining a combination of the amplitudes of each servo burst pair includes the steps of differencing relative amplitudes of the servo burst pair to obtain a difference signal for each servo burst pair, thereby generating at least: (1) a first difference signal and (2) a second difference signal. To generate the C_PES signal, a combination of at least the first and the second difference signals is obtained, wherein the C_PES signal is based at least on that combination of the two difference signals. Combining the first and second difference signals includes the steps of generating a combination of at least the first and the second difference signals according to weighting functions. The weighting functions apply different weighting factors to each of the first and the second difference signals. The weighting factors can vary as function of target position.

As such, in one version, the present invention provides means of solving the conventional tracking problems at the burst switching boundaries by moving the switch points away from the destination/target position regardless of the location of said target position on disk, and provides continuous position error signal indicating position of the head relative to a target position without sudden changes in the C_PES signal.

BRIEF DESCRIPTION OF THE DRAWINGS

These and other features, aspects and advantages of the present invention will become better understood with regard to the following description, appended claims and accompanying drawings.

FIG. 10 is an example functional block diagram of a servo loop within the

FIG. 9 hard disk drive which operates during track following.

Like reference numbers and designations in the drawings refer to like elements.

DETAILED DESCRIPTION OF THE INVENTION

Figure 1:
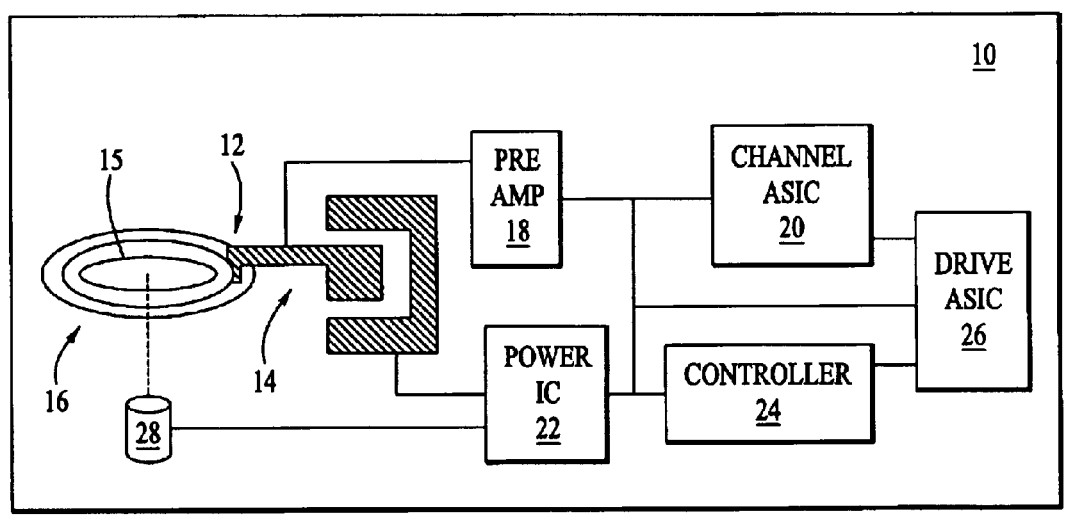
FIG. 1 shows a block diagram of an example architecture of an embodiment of a disk drive in which the present invention can be implemented.

FIG. 1 shows an example embodiment of a disk drive 10 in which the present invention can be implemented. The disk drive 10 comprises a head structure 12 including one or more MR heads moved by a support arm of an actuator assembly 14 via a VCM across tracks of one or more disks 16 for data storage and data retrieval, and tracking to maintain the head over a target position. Each disk 16 includes a servo pattern including servo bursts 11 (FIG. 2) and user data on a recording surface thereof. The disk drive 10 further includes a preamplifier 18 for amplifying the read and write signals from and to the disks 16, respectively, and a channel ASIC 20 for encoding and decoding data between user information and data written on disks 16. The channel ASIC 20 also decodes servo track number and converts servo burst amplitudes into digital values. The disk drive 10 further includes a power driver IC 22 for driving the actuator 14 and a spindle motor for rotating the disks 16, and a microcontroller (e.g. microprocessor) 24 and drive controller ASIC 26 for general control of the components of the disk drive 10 and interface to a host system.

Servo bursts 11 induce analog signals in the head 12 that are amplified by the preamplifier 18 and processed through the channel ASIC 20. The channel ASIC 20 includes an analog to digital converter (ADC) to convert the analog servo burst signals to digital values representing the amplitudes of analog signals. The microcontroller 24 and the drive controller ASIC 26 further process the digital data to determine head position information, and provide servo control signals to the actuator 14 for seeking and tracking operations, forming a servo loop system such that the actuator 14 moves the head 12 in response to said control input signals.

In one scenario, track number and burst signals are read by the head 12 from disks 16, amplified by preamplifier 18, and analog burst signals are decoded into digital burst amplitude values by the channel ASIC 20. The drive controller ASIC 26 holds all decoded digital data (e.g., track number, burst amplitudes, etc.) and the microcontroller 24 (demodulation controller) processes the digital data to obtain head position information including position error signal, whereby the microcontroller 24 provides control signals to the actuator 14 for positioning the head 12 (e.g., seeking to a target position, tracking over a target position, etc.).

Figure 2:
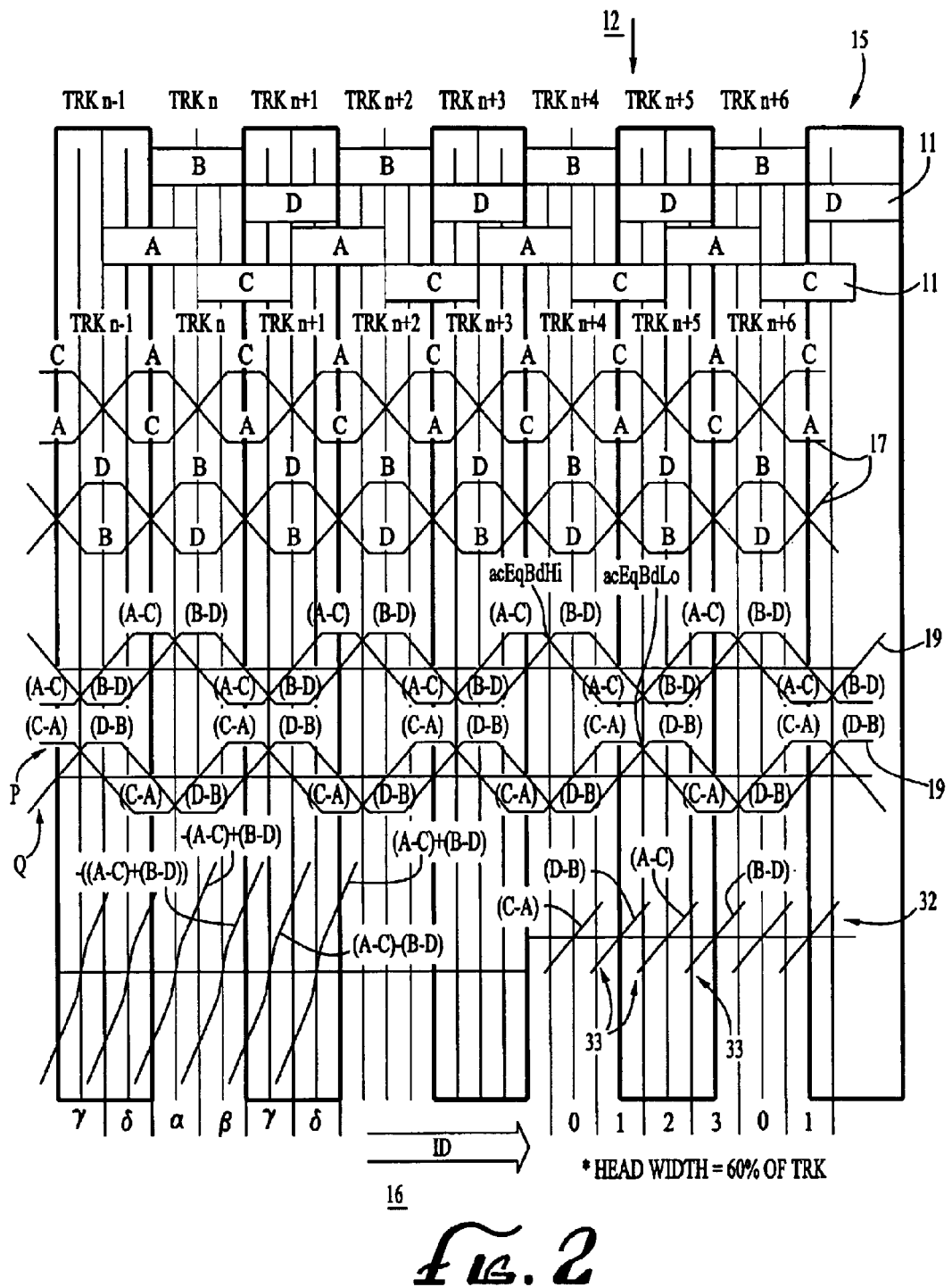
FIG. 2 shows an example partial servo burst pattern layout for a disk drive.

With reference to FIG. 2, an example pattern of servo bursts 11 in servo sectors embedded within the concentric tracks 15 on a recording surface of a disk 16 is shown, wherein the servo burst pattern comprises four time-sequential bursts 11 including: an A burst, a B burst, a C burst and a D burst. The bursts 11 are circumferrentially spaced and read by a read element of the head 12. One burst is distinguished from another by relative position in a track and relative position to other bursts.

In FIG. 2 the tracks 15 run up and down the drawing sheet (e.g., numbered odd Trk n−1, even Trk n, odd Trk n+1, even Trk n+2, etc.), wherein the disk inside diameter (ID) is at the right of the drawing and the disk outside diameter (OD) is at the left of the drawings sheet. The read/write head 12 passes over the bursts from top to bottom of the drawing. Due to narrow reader element gap widths, MR read heads generally produce a nonlinear position error signal (PES) profile when reading burst formats such as the quadrature burst pattern format in FIG. 2.

The pattern of servo bursts 11 are used by the servo loop system for positioning of the head 12 relative to the tracks 15. The bursts 11 include flux transition and when the head 12 passes over the flux transitions, the head 12 generates a signal with repeating cycle variations which can be demodulated and decoded to provide a position error signal (PES) indicating position of the head 12 over the disk 16. Head signals 17 corresponding to the servo bursts A, B, C and D are shown superimposed on the tracks 15 in FIG. 2. The PES signal is utilized to generate an input signal for the head positioning servo system in the disk drive 10 to correct the position of the head 12 relative to a head target/destination position.

In one example, the signal amplitude from the flux transitions in the bursts induced to the head 12 is used in a decoding process by demodulating the induced head signals 17 to form difference signals 19 including a P signal wherein P=C−A, and a quadrature signal Q=D−B. The difference burst signals (burst phases) C−A and D−B are superimposed on the tracks 15 in FIG. 2 relative to corresponding servo bursts 11.

Fine position head tracking information is decoded by using C-A phase when the head 12 is within about +/−¼ track width from track centerlines (indicated by even numbers 0 and 2), and by using the D-B phase when the head is within about +/−¼ to +/−¾ track width from track centerlines (indicated by odd numbers 1 and 3). Throughout this description, the terms difference burst signal, difference value and burst phase, for each pair of servo bursts are used interchangeably to designate the difference between two values representing amplitudes of two respective signals induced in the MR head by the pair of servo bursts, and include for example C-A, D-B, A-C, D-B, P signal, Q signal, etc. indicated as difference signal 19 in FIG. 2.

The difference signals P and Q are out of phase by 90 degrees. When the head 12 detects bursts from more than one track 11 at a time, the P signal should be zero when the head 12 is tracking along the track centerline because equal amounts of magnetic flux is received by the head 12 from the C and A bursts. When the head 12 is tracking ½ track width away from the track centerline, the Q signal should be zero because equal amounts of magnetic flux is received by the head 12 from the D and B bursts.

The P and Q signals are cyclic as the head 12 moves laterally across the disk 16, wherein the P and Q signals can be used in combination to obtain a PES signal 21, forming the switched pattern PES signal 32 by selecting between the P, Q, −P and −Q signals based on the linear operating range of the P and Q signals. As such, if the magnitude (i.e. absolute value) of the Q signal is greater than the magnitude of the P signal, then the P signal, multiplied by the opposite sign/polarity of the Q signal [i.e. P*sgn(−Q)], is selected as the PES signal. Otherwise, the Q signal multiplied by the sign/polarity of the P signal [i.e. Q* sgn(P)], is selected as the PES signal. The switched PES signal 32 represents the linear portions of the respective P and Q signals, indicating direction of head movement for maintaining the head 12 at desired track position (e.g., at a track centerline, ¼ width from a track centerline, between two track centerlines, etc.).

Therefore, to find the current (measured) head position relative to a track on the disk 16, the servo system uses the signal amplitude from servo bursts induced in the head as described. The servo system switches between the P and Q signals at burst phase switch points/boundaries 33 fixed in relation to radial position of the read head relative to a track, as shown in FIG. 2. For example, the servo system switches from the C-A phase (P signal) to the D-B phase (Q signal) or vice versa at every ¼- and ¼-track width position relative to track centerlines.

In one example, the current measured head position is calculated as follows:

MeasuredPosition=TrackNumber+Offset+slopeGain*PesRamp where, TrackNumber is the current decoded digital track number from the servo pattern, slopeGain is pre-calibrated for each head to determine the burst signal gain, and Offset and PesRamp are selected as in the example Table I below based on the burst amplitudes:

TABLE I

|   | (C-A) > (D-B) | (C-A) < (D-B) |
| --- | --- | --- |
| (C-A) < −(D-B) | Offset = 0, PesRamp = (C-A) | Offset = +/−½ track, PesRamp = −(D-B) |
| (C-A) > −(D-B) | Offset = +/−½ track, PesRamp = (D-B) | Offset = 0, PesRamp = −(C-A) |

The sign/polarity of Offset is determined based on even and odd track number and the relative burst amplitudes.

As such the position error signal can be determined as:

PES=MeasuredPosition−TargetPosition or

PES=TrackNumber+Offset+slopeGain*PesRamp−TargetPosition

For example, if the head 12 is around an even track centerline, then (C-A) is greater than (D-B), and less than −(D-B), wherein from the above table, Offset=0 and PesRamp=(C-A).

Figure 3:
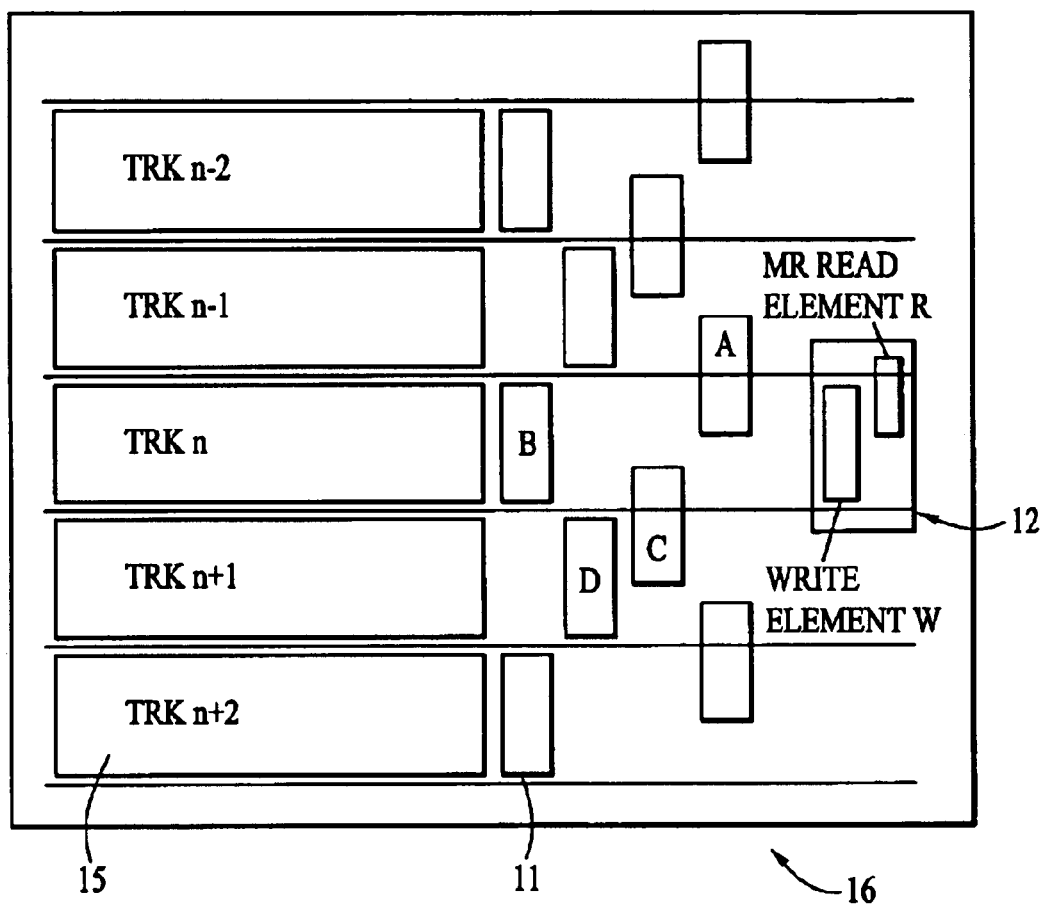
FIG. 3 shows an example schematic of an MR head positioned over tracks on the disk relative to servo bursts.
Figure 4:
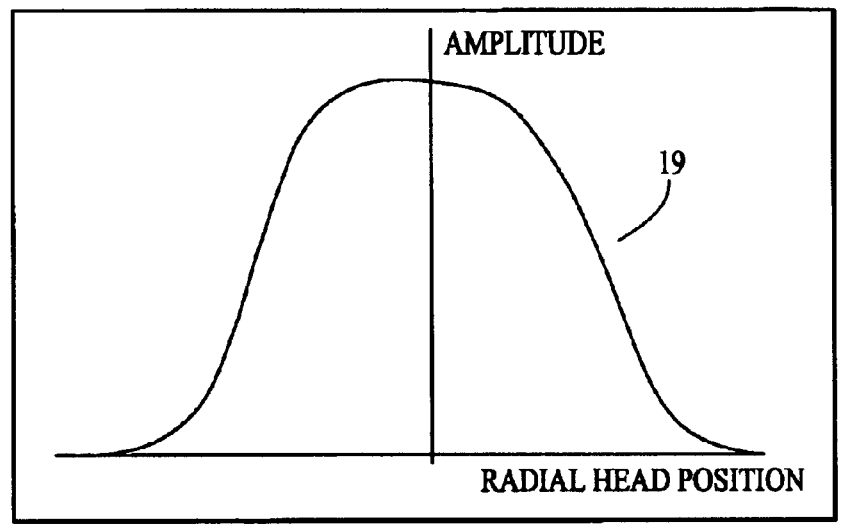
FIG. 4 example burst amplitude signals induced in a non-linear head across a track.
Figure 5:
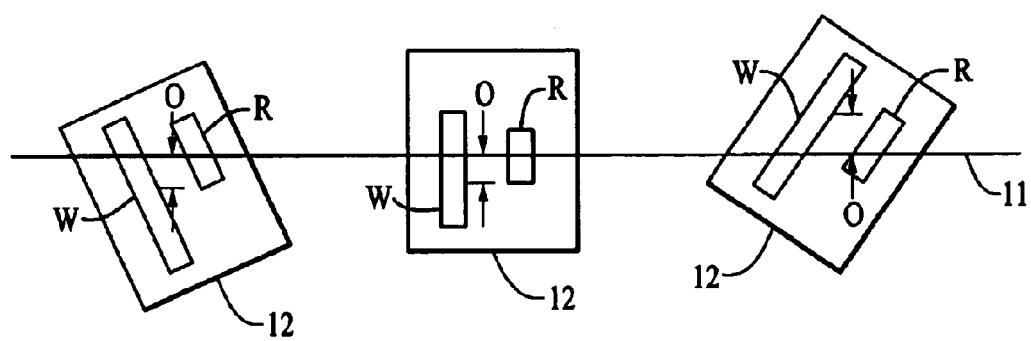
FIG. 5 shows several examples of read/write offset on an MR head on a rotary actuator varying by different skew angles at different radial position.

FIG. 3 shows an example schematic of an MR head 12, including a read element R and a write element W, positioned over tracks 15 on the disk 16 including the servo bursts A, B, C and D. As shown in FIG. 4 the burst amplitude signal 19 induced in the head 12 across a track has a flat top caused by narrow read elements, and asymmetric signal amplitude, resulting in non-linearity of the MR head signal and discontinuity of the PES signal 32. Referring to FIG. 5, the offset O between the read element R and write elements W in the head 12 is due to not only the misalignment of the read and write elements by the manufacturer but also the varying skew angle of the MR head relative to the tracks 11 across stroke of a rotary actuator. With increasing track density in many disk drives, the offset O can be over a track width, while the servo system is often required to position the head 12, and maintain the position, anywhere between two tracks to read and write properly.

Figure 6:
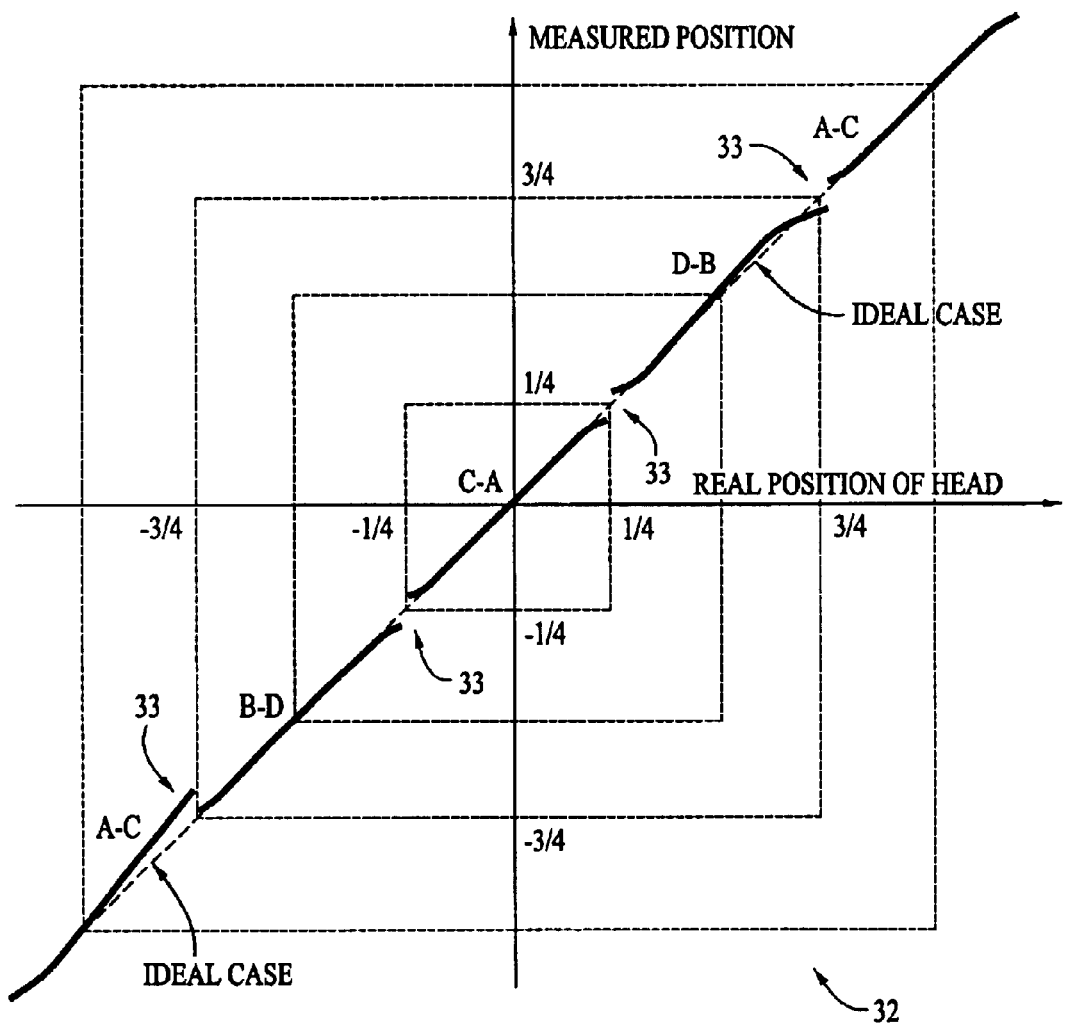
FIG. 6 shows a graph of measured position versus actual position according to non-linear position signals.

Referring to FIG. 6, due to the non-linearity of the MR head 12 as a position transducer, the graphs representing measured C-A phase (P signal) and D-B phase (Q signal) are not perfectly straight (linear) around the switch points 33. The non-linearity in the P and Q signals around the switch points 33 results in a discontinuous and non-linear PES signal 32. The discontinuity in the PES signal 32 around the switch points 33 causes tracking problems around the ¼ and ¾ track positions due to the switching between the non-linear P and Q signals at those switch points 33. The servo system uses the measured head position information (i.e., PES signal) to maintain the head position at a target position relative to the tracks. A major disadvantage of the non-linearity in the P and Q signals near the switch points 33 is that, the measured head position indicated by the PES signal 32, and actual/real head position can be different.

Further, as shown by example, due to the non-linearity in the slopes of the C-A and D-B phases (P and Q signals) around the ¼ track width position relative to track center line, there is an inaccurately large difference between the measured head position when the head 12 is near ¼ width of the track center line using the C-A phase (P signal), and the measured head position when the head 12 is near the ¼ track width of the track center line using the D-B phase (Q signal). If the slopes of the C-A and D-B values are not close enough, then a small radial head movement around said ¼ track width position results in two different position information feed into the servo system, making the servo system unstable at that position. The inaccurately large difference causes the servo system to overcorrect the head position near the switch points 33, causing "chattering".

To solve the above problem, in one embodiment of the present invention, for each target/destination position, the difference signals 19 corresponding to a switch point 33 within a certain track width distance of the target position are combined to generate a substantially continuous (and preferably linear) position error signal C_PES for the head position. As such, the switch points 33 are effectively "mapped" to locations away from the destination/target position, providing a continuous position error signal C_PES indicating radial head position relative to the target position without sudden changes in the position error signal C_PES.

In one implementation, in track following for a target head position, the servo system determines and combines two difference signals (e.g., P signal and Q signal) corresponding to a head position to generate a substantially continuous C_PES signal around the target position. For example, in FIG. 2, if the target position is around ¼ track width from the centerline of track Trk n+4, then the switch point 33 for the difference signals P and Q (e.g., two difference burst signals C-A and D-B, respectively) is on that target position and a possible discontinuity of the P and Q signals causes a servo chattering problem. According to the present invention, the two difference signals P and Q are combined to generate a substantially continuous C_PES signal around that target position. Preferably, the difference burst signals are combined to generate a substantially linear signal. Though in the description herein the P signal corresponds to the difference C-A, and the Q signal corresponds to the difference D-B, each of the P and Q signals can correspond to other combinations of the burst signals (e.g., A-C, B-D, etc.) in different embodiments of the present invention.

The difference burst signals 19 (e.g., signals P and Q) can be combined using any method that generates a combined position error signal that is substantially continuous according to predetermined criteria (e.g., according to different performance requirements for each disk drive). In one version, the difference signals can be combined by fitting curves defined by second or higher order polynomials. In another version, the difference signals can be combined using smoothing functions. In another version, the difference burst signals are combined using methods approximating weighing functions.

In an embodiment described below, the difference burst signals are combined using weighting functions by selecting weighting factors that provide a substantially continuous position error signal C_PES according to the following relation:

C_PES=weighting function (first difference signal, second difference signal)

Other versions of the present invention using other methods of combining the difference signals to generate a substantially continuous position error signal C_PES are possible and contemplated by the present invention.

Figure 7:
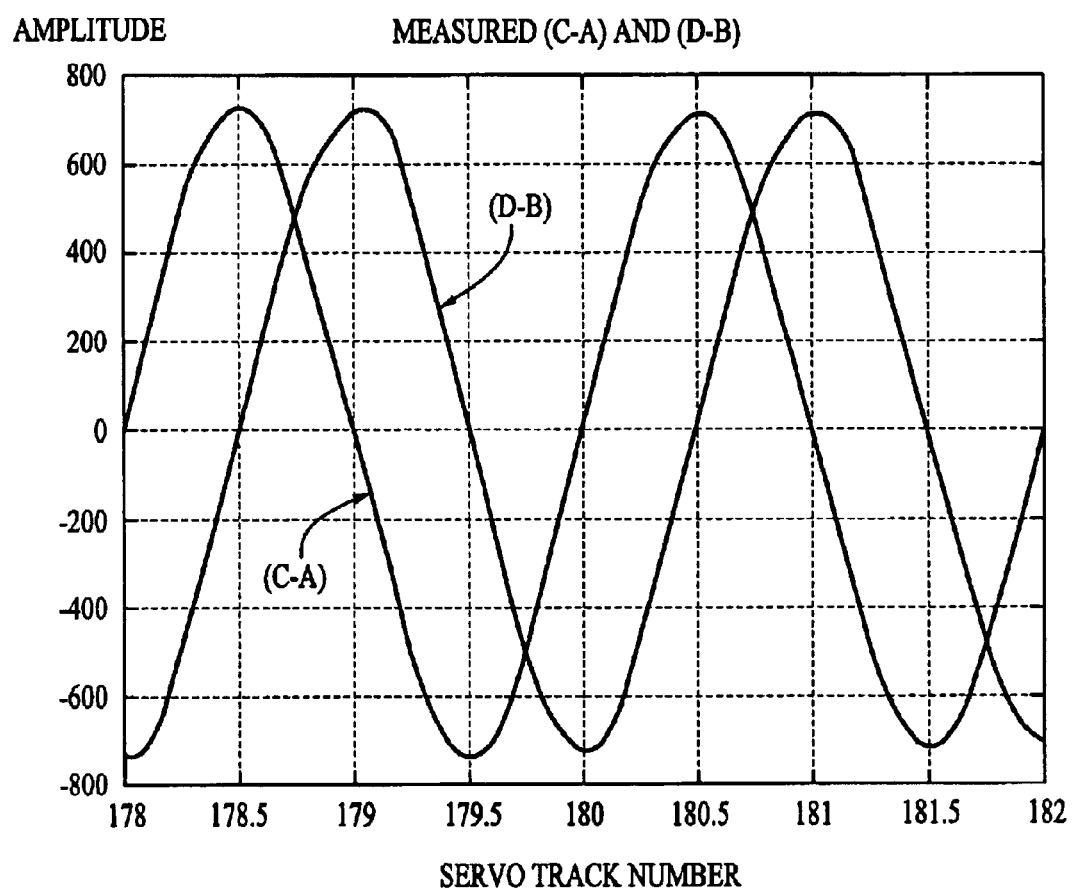
FIG. 7 shows example cross track difference burst signal amplitudes (vertical axis) relative to track number (horizontal axis).

In the example below, the difference signals are combined to generate a substantially continuos error signal at and near the target position using an example weighting function. The weighting function comprises a different weighting factor for each difference signal. Preferably, each weighting factor varies based on target position. FIG. 7 shows example cross track signal amplitudes (vertical axis) for first and second cyclical difference signals (C-A) and (D-B) relative to track number (horizontal axis). Generally, the difference signal C-A is one-quarter signal phase (90 degrees) from the difference signal D-B.

In one version, the servo system combines the C-A and D-B difference signals to obtain a PES_P signal, wherein the C_PES signal is based on the PES_P signal. In one example, the PES_P signal is determined according to the following weighting function equation I:

PES_P=(first difference signal)* cos(X)+(second difference signal)* sin(X), wherein X=targetPosition*pi, and pi=180 degrees        (equation I)

Where the first difference signal comprises the P signal, and the second difference signal comprises the Q signal:

PES_P=(P signal)* cos(X)+(Q signal)* sin (X)

And, where the P signal comprises the C-A signal, and the Q signal comprises the D-B signal:

PES_P=(C-A)* cos(X)+(D-B)* sin(X)

As shown in FIGS. 2 and 6, around each track center line, and ½ track width from track center line, the P and Q signals are linear. However, the P and Q signals become non-linear around the ¼ and ¾ track widths. As such, every ½ track width, the P and Q signals (e.g., difference signals C-A, D-B, –(C-A) and –(D-B)), are linear around zero amplitude. According to the above equation I, the difference signals are shifted such that the linear position of the difference signals around zero amplitude occur at the target position. This provides a substantially continuous PES_P signal, and accordingly substantially continuous C_PES signal, at every target position, alleviating the non-linearity of the switched PES signal, at least around the ¼ track width target positions.

Figure 8A:
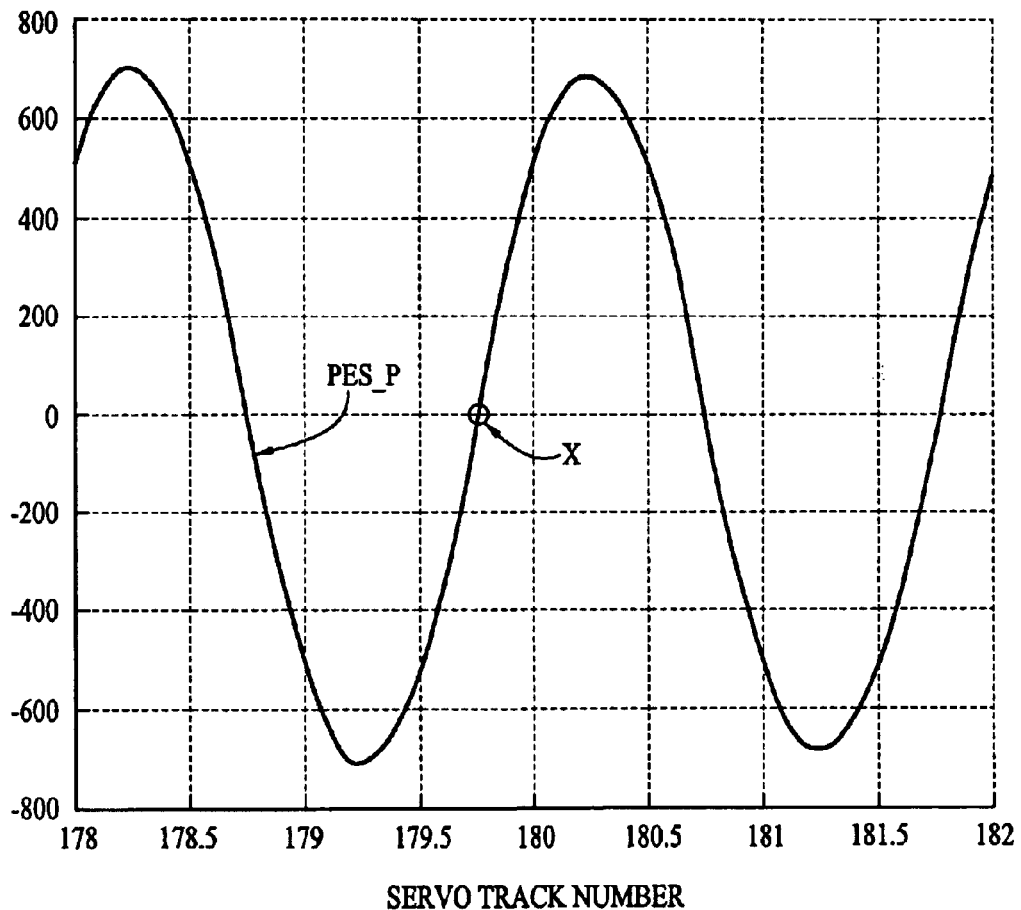
FIG. 8A shows an example PES_P signal generated for a selected target position.

Because the difference signals P and Q are cyclic, the above equation I is used to shift the difference signals to have their zero-crossings at the target position, providing a substantially continuous PES_P signal around the target position. FIG. 8A shows an example PES_P signal generated for a target position of X=179.75 using the C-A and D-B signals of FIG. 7 according to the above equation I.

At the target position 179.75 (i.e. ¾ track width from track number 179), the PES_P signal has a zero-crossing, wherein the amplitude of the PES_P signal indicates the difference between the actual position and the target position (position error value). As such, the above equation I can be used to generate a continuous PES_P signal around every target position, to determine position of the head 12, wherein the C_PES signal is based on the PES_P signal.

Where the actual position of the head 12 is not near (e.g., within ½ track width from) the target position, due to the repeating pattern of the PES_P signal, multiple positions for the same PES_P signal can be indicated. To compensate for this possible ambiguity, a conjugate PES_Q signal is generated, wherein the C_PES signal is based on the PES_Q signal when the head is not near the target position. Equation II below provides an example calculation for the PES_Q signal as function of the two difference signals:

PES_Q=(second difference signal)* cos(X)–(first difference signal)* sin(X), wherein X=targetPosition*pi        (equation II)

Where the first difference signal comprises the P signal, and the second difference signal comprises the Q signal:

PES_Q=(Q signal)* cos(X)–(P signal)* sin (X)

And, where the P signal comprises the C-A signal, and the Q signal comprises the D-B signal:

PES_Q=(D-B)* cos(X)–(C-A)* sin(X)

Figure 8B:
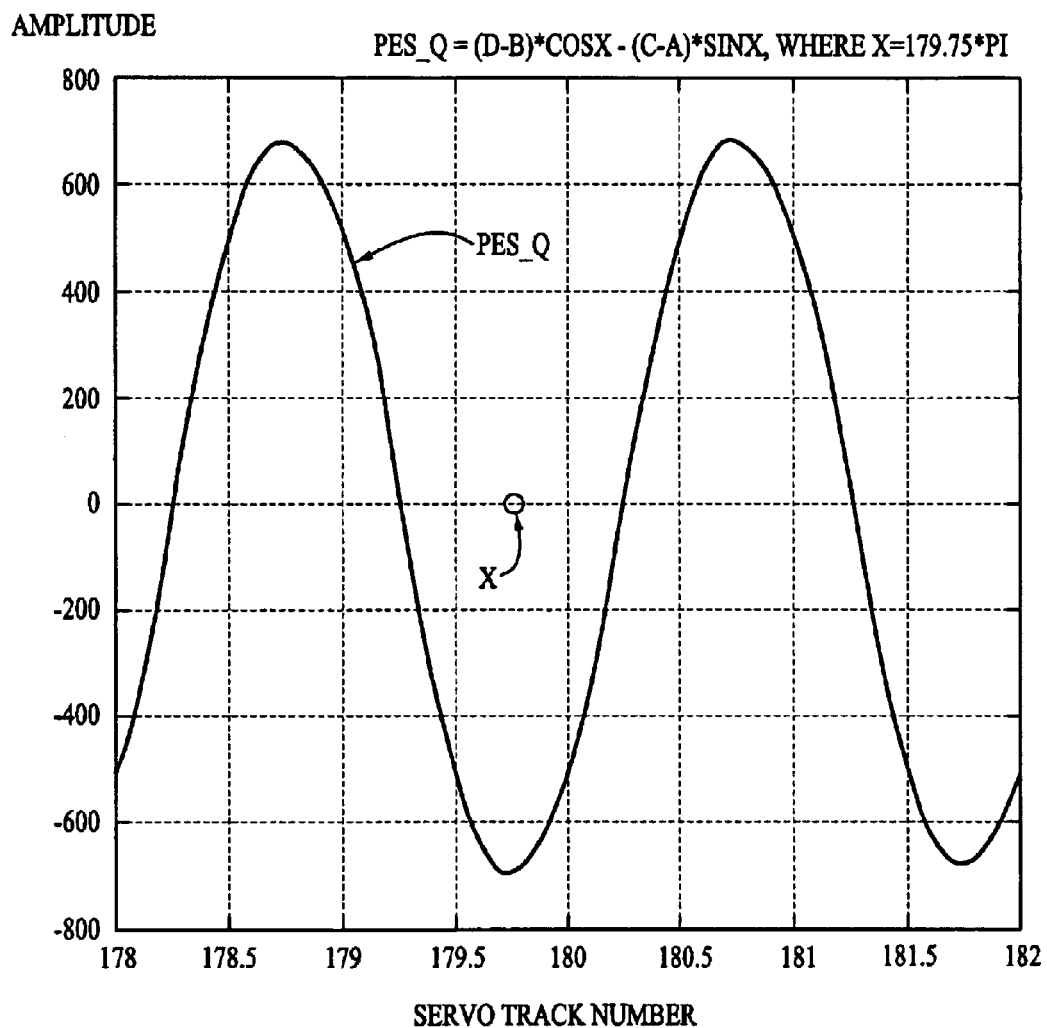
FIG. 8B shows an example PES_Q signal generated for the selected target position of FIG. 7.
Figure 8C:
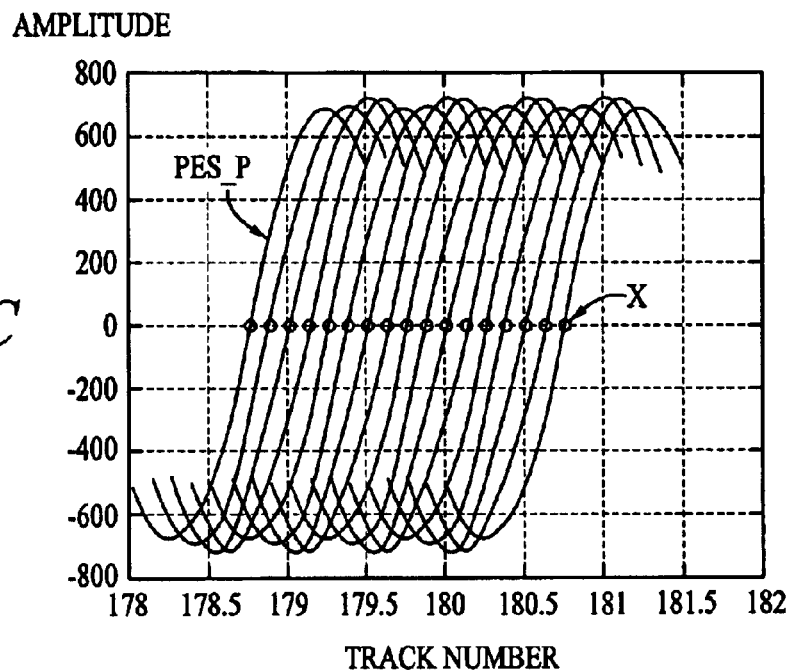
FIG. 8C shows example PES_P signal generated for different target positions.
Figure 8D:
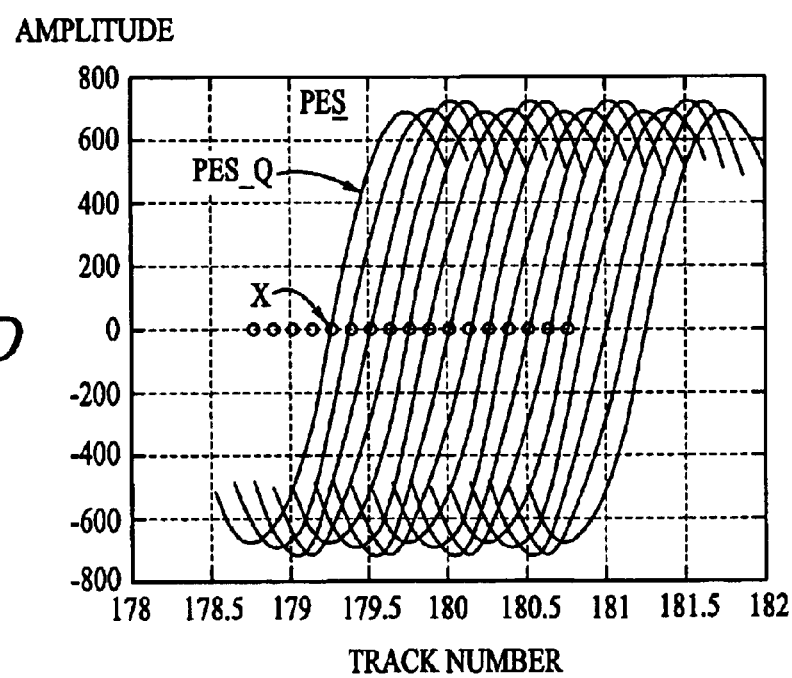
FIG. 8D shows example PES_Q signal generated for the different target positions.

FIG. 8B shows an example PES_Q signal generated for a target position of X=179.75 using the C-A and D-B signals of FIG. 7 according to the above equation II. FIG. 8C shows example PES_P signal generated for different target positions X, and FIG. 8D shows example PES_Q signal generated for the different target positions.

The servo system uses the pair PES_P and PES_Q signals to obtain the C_PES signal, and along with track number information determine the current head position without a discontinuity problem around the target position. The PES_P and PES_Q signals are 90 degree out of phase. Depending on the amplitude of each of the two signals PES_P and PES_Q corresponding to a head position, one of the two signals PES_P or PES_Q is selected to calculate the continuous position error signal C_PES to provide position information to the servo system as shown in the example Table II below:

TABLE II

|  | PES_P > PES_Q | PES_P < PES_Q |
| --- | --- | --- |
| PES_P < −PES_Q | Offset = 0, PesRamp = PES_P | Offset = −½ track, PesRamp = −PES_Q |
| PES_P > −PES_Q | Offset = ½ track, PesRamp = PES_Q | Offset = 1 track, PesRamp = −PES_P |

The signal C_PES is then determined according to the following equations in conjunction with Table II, wherein:

$$\text{Fraction} = \text{Offset} + \text{slopeGain} \ast \text{PesRamp},$$

$$C\_PES = 2 \ast \text{round}((\text{TrackNumber} - (\text{TargetPosition} + \text{Fraction}))/2) + \text{Fraction} - \text{TargetPosition} \quad \text{(equation III)}$$

The conditions (PES_P>PES_Q) and (PES_P<−PES_Q) occur when the head position is +/−¼ tracks width from the target position, whereby Offset=0 and PesRamp=PES_P are selected to calculate the C_PES signal. If the head position is between ¼ and ¾ track width away from the target position, then (PES_P>PES_Q) and (PES_P>−PES_Q) are satisfied, and Offset=½ and PesRamp=PES_Q are selected to calculate the C_PES signal.

As such, according to the present invention, the transition between the PES_P and PES_Q signals in C_PES (transition point) is based on the target position rather than the predetermined fixed switch points 33 in relation to radial position of the read head relative to a track for the switched PES signal 32. In the above example, the transition between the PES_P and PES_Q signals occurs at least ¼ track width away from the target position no matter where the target position X is relative to one or more of the tracks. As such, during a seek operation, transition between the signals PES_P and PES_Q takes place around +/−¼ and +/−¾ track width away from the target position, but said transition never takes place during track following at any target position X, eliminating servo system instability/chattering around the target position. The transition point between the PES_P and PES_Q signal occurs at least ¼ track width away from the target position instead of every +/−¼ track fixed switched point 33 in the switched PES signal 32. Said ¼ track width transition point from a target position X is only an example and other transition points can be used.

The transition between the PES_P and PES_Q signals occurs only once while passing the transition point toward the target position X, alleviating discontinuity of the position error signal and stability problems of conventional servo system using the switched PES signal 32. The combination of the difference signals can be used to obtain a substantially continuous position error signal C_PES for all target positions, including target positions at or near the fixed switching points 33 (e.g. the +/−¼ track width from track center line positions).

In the above example embodiment, the difference bursts 19 are combined to generate a substantially continuous position error signal C_PES at and/or near a target position X using the weighting factors sin(X) and cos(X). Each of the sin(X) and cos(X) functions comprises a varying weighting factor changing smoothly from −1 to +1 based on target position X. A different weighting factor is applied to each difference signal in said combination (e.g., sin(X) is applied to (C-A) and cos(X) is applied to (D-B) to generate PES_P). When the difference bursts are combined, as described in relation to equations I and II, the smoothly varying sin(X) and cos(X) weighting factors are applied to the difference bursts to combine them and obtain the continuous signals PES_P and PES_Q, to determine the position error signal C_PES around the target position X according to equation II. Other methods of combining the difference bursts to obtain substantially continuous position error signals C_PES at any target position are contemplated by the present invention.

Figure 9:
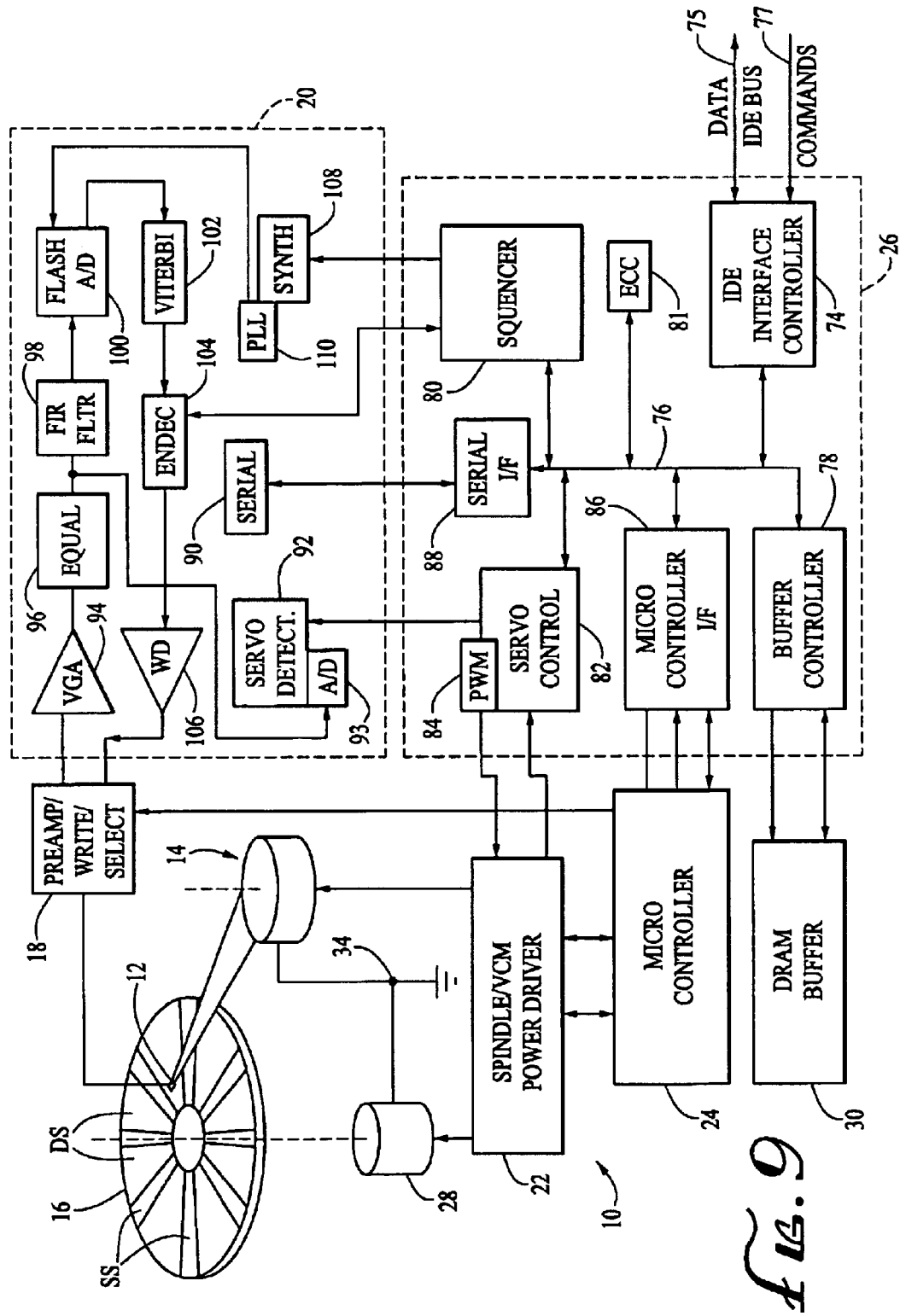
FIG. 9 shows a block diagram of an example architecture of a disk drive including the continuous position error signal C_PES generation means according to the present invention.

FIG. 9 provides another example of electrical details concerning the hard disk drive 10 of FIG. 1. Other versions of the disk drive electronics/hardware for implementing the present invention are possible and contemplated by the present invention. As shown in FIG. 9, the voice coil actuator assembly 14 and a spindle motor 28 are mounted to a disk drive base plate or housing 34. A cover (not shown) encloses the head 12, and the disk 16 in order to minimize adverse influence of particulate contaminants which are typically purged within so-called "flying head" or Winchester hard disk technology. Structural details of the base plate are not pertinent to an appreciation of the present invention and are not presented. While only one head 12 and one disk 16 are shown in FIG. 9, those skilled in the art will appreciate that each data storage surface would typically have a separate head (e.g., MR head), and that multiple disks may be mounted onto a common spindle and rotated in unison by the spindle motor 28. All heads would be moved in unison by the rotary voice coil actuator structure 14.

The disk drive 10 includes the disk drive controller ASIC 26, the analog/digital mixed signal read and write channel chip 20, the read preamplifier/write/selector chip 18 located as close as practical to the head structure 12 to minimize noise, a data and firmware DRAM buffer 30, the microcontroller 24, and the digital/analog mixed signal motor driver power chip 22. The driver chip 22 provides operating power to a voice coil motor of the actuator 14, and provides driving currents to a disk spindle motor 28 for rotating the disk 16 at a predetermined constant angular velocity.

The drive controller ASIC 26 includes an interface section 74 providing an interface data bus 75 and command bus 77 connections to a host computing environment. In the illustrated example, an IDE bus interface structure is contemplated. An internal bus structure 76 within the drive controller ASIC 26 carries both commands and data from the interface controller 74 to other circuit functions within the controller ASIC 26. Those functions include a buffer controller 78 for controlling and refreshing the DRAM buffer 30. A sequencer 80 is included for controlling the sequencing of data blocks to and from the write/read channel chip 20, and a dedicated ECC function 81 provides error correction code protection to each of the data blocks sent to and received from the disk 16 via the write/read channel 20 and preamplifier circuit 18.

A servo controller 82 receives and decodes the servo fields from each servo sector SS, except for the burst amplitude values. The servo controller 82 reports servo status to the microcontroller 24 when errors in a servo sector SS are detected. A pulse width modulator 84 provides a command current driving control signal to the spindle motor/voice coil motor driver chip 22 for controlling positioning of the voice coil actuator 14. The current driving control signal can comprise e.g. a six-bit plus five-bit pulse width modulation with four-times oversampling. These values are summed within the motor driver chip 22 to provide thirteen bits to control the magnitude of the voice coil motor coil current. These values are subsequently low pass filtered to produce an analog current command signal. The PWM value received at the modulator 84 is computed by and sent from the microcontroller 24 under direction of servo control loop firmware.

A micro-controller interface 86 enables the microcontroller 24 to receive its instructions from the DRAM buffer 30 and to execute commands and control disk drive functions. A serial interface 88 enables the drive controller ASIC 26 to pass commands to the write/read channel chip 20, via a serial interface circuit 90 in that chip. Execution of the sequences of instructions contained in the DRAM buffer 30 (or other memory) causes the microcontroller 24 (e.g., microprocessor) to perform process steps described herein. One or more processors in a multi-processing arrangement can also be employed to execute the sequences of instructions contained in the DRAM 30. In alternative embodiments, hard-wired circuitry (e.g., ASIC) may be used in place of, or in combination with, software instructions to implement the invention. Thus, embodiments of the invention are not limited to any specific combination of hardware circuitry or software.

The mixed-mode write/read channel chip 20 also includes a servo burst amplitude peak detector circuit 92 which sequentially samples and holds analog burst peak amplitude values read from the A, B, C and D bursts by the read element of the head 12. The peak detector circuit 92 is preferably implemented as a rate-controlled charge only peak detector for extracting the peak amplitudes of the A, B, C and D bursts read from each servo sector SS. The detector 92 has two operating modes: fast charging used during initial charging, and slow charging used during final settling to peak value for each burst. During all modes of operation, the A, C, B, D bursts-are used. The gate inputs to the peak detector 92 and the control of which bursts are sampled, are sent from the servo controller 82. The timing of the gate inputs (i.e. delay to start, and sampling duration) is programmable. An e.g. eight-bit servo analog-to-digital converter (ADC) 93 receives sampled and held burst amplitude values and converts them into digital values for processing by the servo control loop during track following operations. The digitized burst peak values are sent over the serial data path from the write/read channel chip 20, through the serial interface 88 of the disk drive controller ASIC 26, and through the microcontroller interface 86 to the microcontroller 24. The servo control loop firmware executed by the microcontroller 24 is used to determine actual head position, and correct the actual head position to the desired position as described herein.

Signals from the disk 16 are read by the MR read element R of the head 12, preamplified by the preamplifier function within the preamp/write/selector chip 18 and sent to a variable gain amplifier (VGA) 94. During servo time, gain of the VGA 94 is set with reference to reading of an AGC field on the disk 16. A programmable analog equalizer 96 enables a readback function to be equalized to a predetermined partial response signaling channel, such as Partial Response, Class 4 (PR4) during data readback, and to the servo bandwidth during servo readback intervals. Also, an analog adaptive finite impulse response filter 98 is used to equalize the data signals to the predetermined data channel conditions. A flash analog to digital converter 100 converts data samples into digital values. These digital values are then fed into a maximum likelihood detector, such as a Viterbi detector 102, which selects and puts out most likely coded data values in accordance with predetermined coding constraints within the partial response scheme being employed. An encoder/decoder 104 decodes coded values received from the Viterbi detector 102 during reading operations, and encodes data values received from the sequencer 80 during writing operations. A write driver 106 generates write driving currents and selectively applies the driving currents through the head select chip 18 to energize an inductive writing element W of a selected head 12 (only one head 12 shown in FIG. 9).

In this embodiment, there are three servo modes of operation of the disk drive 10. A fast seek mode is used to move the read/write head 12 from one concentric track radial position to another, relatively distant radial track location in a minimum time interval. In order to perform efficient seeking operations, the fast seek mode has five sub-modes: acceleration, coasting, deceleration, linear velocity control, and linear velocity with low bandwidth. Fast seek mode is based on velocity control. Since the fast seek mode does not rely on servo bursts for control information, it will not be discussed in any greater detail. The second mode is the track settling mode. This mode is used for single-track seeks, head switches, and final approach to track center on longer seeks. It uses position control rather than velocity control, and therefore it relies upon the burst amplitude position information provided by the A, B, C and D bursts. Track settling mode is very similar to the FIG. 10 servo on-track mode.

Figure 10:
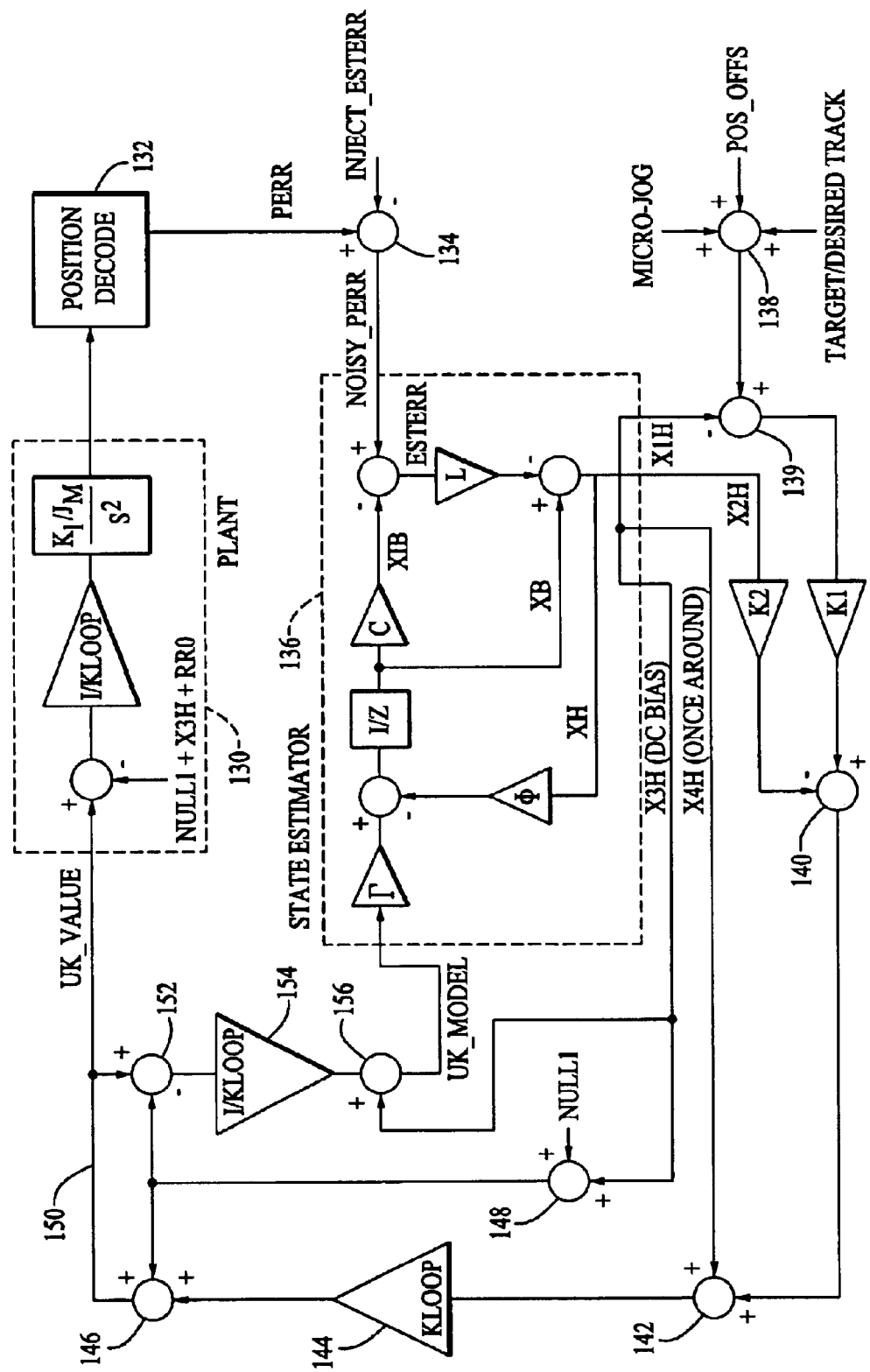

FIG. 10 sets forth a functional diagram of the third mode, i.e., servo on-track mode. In this mode, which is designed to require reduced microcontroller processing bandwidth in order to minimize command overhead, the A, B, C and D servo burst patterns are used to obtain a substantially continuous position error signal C_PES as described herein to enable identification of exact head position anywhere on the usable data storage surface of the disk 16 as describe herein.

Track following mode employs a state estimator 136, with coefficients selected for good actuator DC stiffness and adequate stability. The position error signal C_PES (PERR) is used to enables fine positioning at any radial point on the surface of the disk 16. With reference to the FIG. 10 servo diagram, the disk drive 10 is modeled as a plant 130 which receives actuator current command values on a path 150 and puts out position signals to a position decode function 132 which puts out position error values (PERR). An injected estimated error is subtracted from the position error at a summing junction 134 and results in a noisy position error which is supplied to the state estimator 136. Another summing junction 138 combines a position offset value, a desired track value (target position), and optionally a micro-jog value to produce a desired position value. The micro-jog reference is set for a given head and radial data zone. Micro jogging is used for read operations because the MR read element of the head 12 must be positioned to be co-linear with the track written to the disk by the thin film write element of the head 12. This micro-jog distance is calibrated during the manufacturing process and is referenced by virtue of a table during read access operations. No micro jogging is needed during data writing operations.

A summing junction 139 subtracts an estimated position value put out by the state estimator 136 from the desired position value put out by the summing junction 138 to produce a refined position value. A velocity component is subtracted from the refined position value at a summing junction 140. A summing junction 142 combines an estimated repeatable runout error correction value with the velocity-excluded refined position value. The repeatable runout error correction value is derived from a control feed forward profile to enable the servo to better track disk shift and head tilt. A gain function 144 then applies a servo loop gain function to the position value before passing it on to another summing junction 146. The summing junction 146 combines the loop gain normalized position value with a value from a summing junction 148 which adds a DC bias estimate value to a null current (NULLI) value. The summing junction 146 puts out the actuator current command value on the path 150 to the disk drive plant 130.

Figure 11:
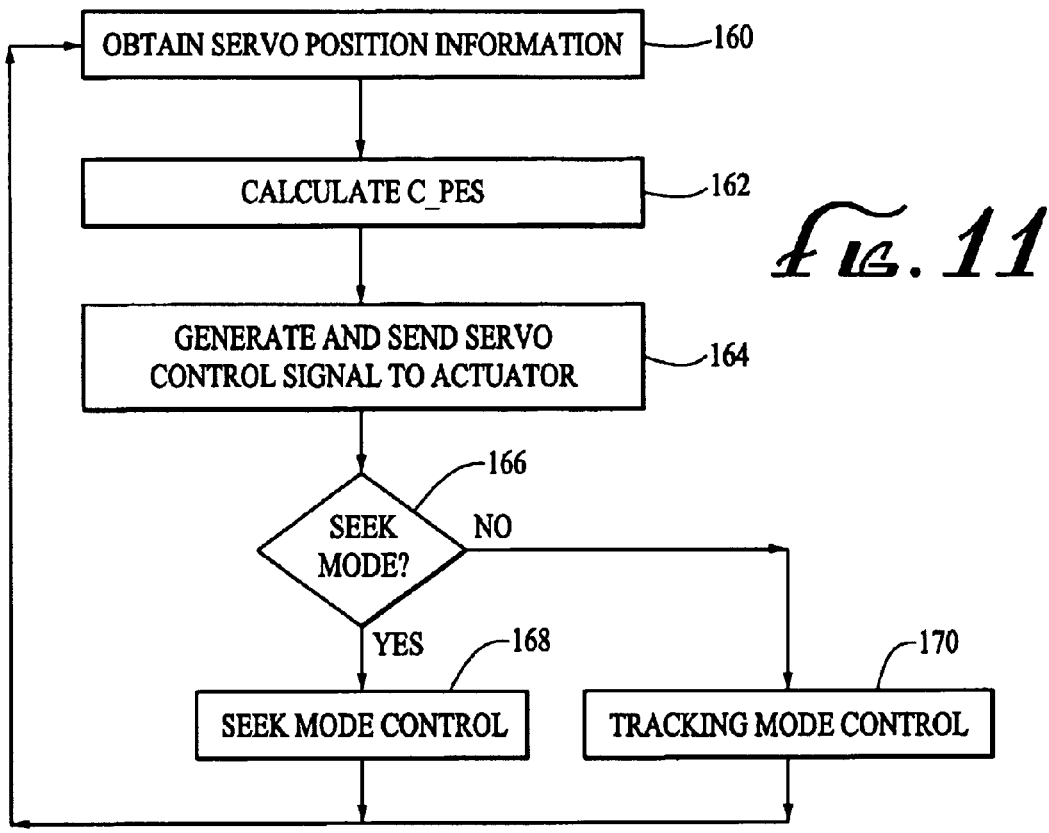
FIG. 11 shows an example flow diagram of an embodiment of steps of general servo control.

FIG. 11 shows an example flow diagram of an embodiment of process steps for servo control which may be followed by the servo firmware executed by at least the microcontroller 24 in controlling the actuator in servo seek and tracking modes. The process steps comprise obtaining head position information including servo burst amplitudes (step 160), calculating the position error signal C_PES (step 162), generating control signals for the actuator based at least on the C_PES signal (step 164), detecting if in seek mode (step 166), if so, providing seek mode control (step 168), otherwise providing tracking mode control (step 170). The above steps are repeated.

Figure 12:
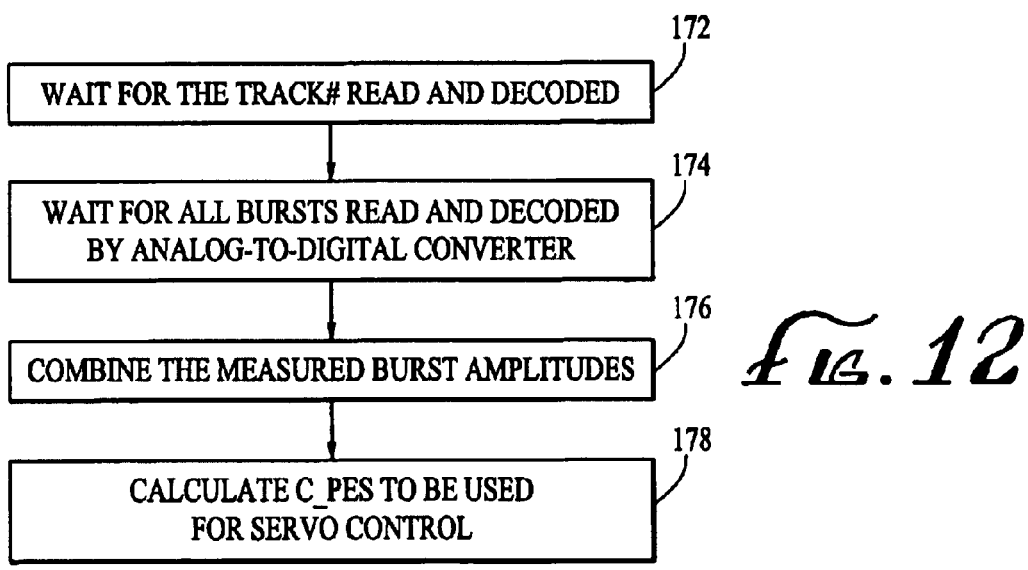
FIG. 12 shows an example flow diagram of an embodiment of steps of generating a substantially continuous position error signal C_PES according to the present invention.

FIG. 12 shows an example flow diagram of an embodiment of process steps 160, 162 in FIG. 11 of obtaining head position information and generating the C_PES signal in track following for a target position. Step 160 includes the steps of obtaining track number read and decode by the servo controller 82 (step 172), and obtaining digital burst amplitude values from the ADC in the channel ASIC 20 (step 174). Step 162 includes the steps of combining the burst amplitudes by e.g. selecting burst pairs and differencing amplitudes of servo bursts in each pair to obtain difference burst signals (e.g., C-A, D-B, A-C, B-D, etc.) (step 176), calculating the signals PES_P and PES_Q from the difference burst signals, and then calculating the continuous position error signal C_PES from the PES_P and PES_Q signals (step 178), as described herein. A path along the FIG. 12 flow diagram is followed at each servo sample time during track following operations of the FIG. 10 servo loop.

Figure 13:
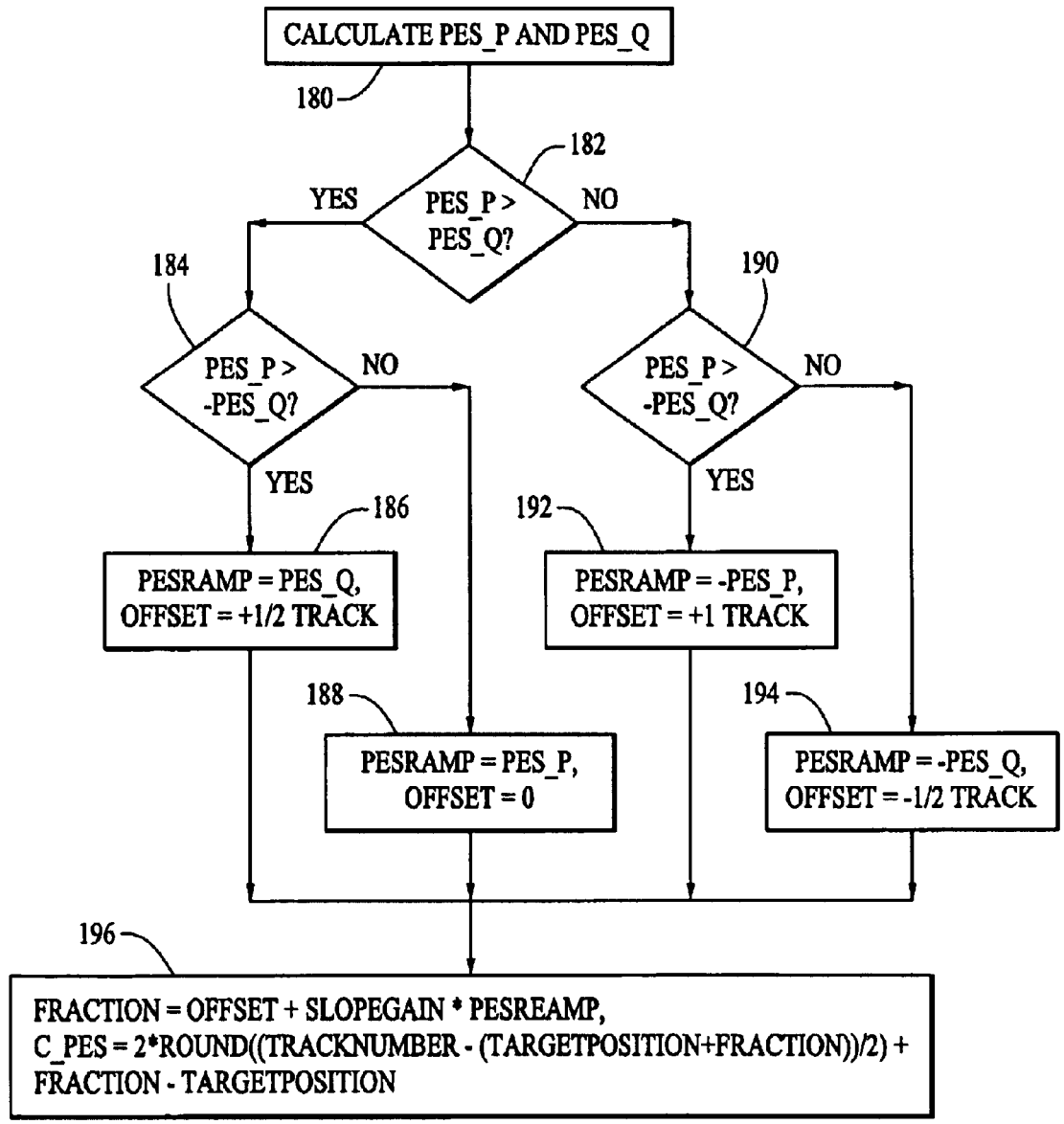
FIG. 13 is a logic flow (decision tree) diagram for selecting PES_P and PES_Q signal component values to be used for C_PES during track following operations by a servo loop such as shown in FIG. 10 (for a four-phase head position decoding scheme).

FIG. 13 sets forth a flow diagram which may be followed by the servo firmware executed by the microcontroller 24 in step 178 of FIG. 12 to calculate C_PES signal from the PES_P and PES_Q signals, in determining head position. When employed, a path along the FIG. 13 flow diagram is followed at each servo sample time during track following operations of the FIG. 10 servo loop. Advantageously, the FIG. 13 flow diagram approach does not impose fixed switch points 33, and implements transitions between PES_P and PES_Q signals based on head position relative to target position as described herein.

The process shown of FIG. 13 includes the steps of calculating the PES_P and PES_Q signals from the difference signals obtained in step 176 of FIG. 12 (step 180) as described herein, and calculating the C_PES signal as a function F of the PES_P and PES_Q signals, where:

C_PES=F(PES_P, PES_Q)

In the version shown in FIG. 13, the function F is implemented as a process to include the steps of: determining if PES_P>PES_Q (step 182), if so then if PES_P>−PES_Q (step 184), then PesRamp=PES_Q and Offset=+½ track width (step 186) otherwise PesRamp=PES_P and Offset=0 (step 188). However, if PES_P<=PES_Q (step 182), then if PES_P>−PES_Q (step 190), then PesRamp=−PES_P and Offset=+1 track (step 192) otherwise PesRamp=−PES_Q and Offset=−½ track (step 194). Once the values of PesRamp and Offset are determined, the signal C_PES is determined as a function of PES_P and PES_Q in one embodiment according to equation III in step 196. The microcontroller 24 utilizes C_PES to provide control signals to the actuator for tracking at each desired target position.

Equation III combines the track number read and the burst signals to generate the final C_PES signal for the servo pattern shown in FIG. 2. Equation III can be modified for different servo burst patterns or different number of servo bursts as contemplated by the present invention.

As the track density of disk drives increase, the effect of side erase bands between servo tracks increases, AC/DC track squeeze increases, and further a large distribution of read element widths are used. Such features contribute to gross non-linearities in the conventionally generated position signals generated from the servo bursts. The discontinuity in the conventional PES decoding causes servo instability and chattering problems detrimental to performance and data integrity. The present invention provides a position error signal decoding method and system using combination of difference servo bursts (difference signals 19) to provide a continuous position error signal C_PES. In one embodiment, the difference servo bursts are effectively shifted to avoid switching between the difference servo bursts around the target position. As such, the discontinuity problems with of the conventional position error signal generation methods is alleviated. Further, by utilizing all the servo bursts always instead of using a pair of servo bursts only, any local problem with a particular servo burst has less impact on the servo system.

The present invention can be applied to any servo pattern comprising four servo bursts and is not limited to the specific servo burst pattern shown in the drawings. Further, although in the example embodiments described herein, the servo pattern comprises four repeating servo bursts A, B, C and D, the present invention can be similarly applied to servo patterns having less than four or more than four servo bursts having a phase relationship therebetween. Regardless of the number of bursts in a servo pattern, two or more difference signals for a target position are obtained and combined to generate a substantially continuous position error signal C_PES around the target position according to the present invention. Each difference signal can be obtained by differencing two or more servo bursts having a phase relationship (i.e. one burst is distinguished from another by relative position in a track and relative position to other bursts).

Further, although in the embodiments described herein values representing amplitudes of signals induced in the head by servo bursts are processed by differencing the amplitude values to obtain difference signals 19 (i.e. phase signals P and Q), and the difference signals 19 are combined to obtain a continuous position error signal C_PES, in other versions the amplitude values can be processed using other functions (in addition to or in place of subtraction) to obtain phase signals that can be combined according to the present invention to generate a substantially continuous position error signal C_PES.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method for generating a position error signal in a disk drive including a magnetic data storage disk rotating relative to a base, a data transducer assembly positioned at concentric data tracks by a rotary actuator referenced to the base and controlled by a digital servo system, the data transducer assembly having a magnetoresistive (MR) read element, the digital servo system employing multiple servo bursts in servo sectors embedded within the data tracks, the method comprising steps of:

during at least one of servo track positioning or following for each target head position relative to one or more tracks:

reading the servo bursts as the tracks pass under read element;

measuring burst amplitudes of the servo bursts;

selecting a plurality of the servo bursts;

obtaining combinations of the burst amplitudes of the selected servo bursts as a function of weighting factors that vary based on target position; and generating a substantially continuous position error signal (C_PES) based on said combinations of the burst amplitudes, indicating radial position of the read head relative to the target position.

2. The method of claim 1, wherein the step of selecting servo bursts includes selecting at least two pairs of servo bursts, and for each selected pair of servo bursts obtaining at least one combination of the burst amplitudes of the selected servo burst pair as a function of said weighting factors.

3. The method of claim 2, wherein the step of selecting servo bursts further includes the steps of selecting each pair of servo bursts in accordance with predetermined burst phase switch points fixed in relation to radial position of the read head relative to a track.

4. The method of claim 3, wherein the step of obtaining a combination of the amplitudes of each servo burst pair includes the steps of differencing relative amplitudes of the servo burst pair to obtain a difference signal for each servo burst pair, thereby generating at least: (1) a first difference signal and (2) a second difference signal.

5. The method of claim 4, further comprising the steps of: generating a combination of at least the first and the second difference signals as a function of said weighting factors, wherein the C_PES signal is based at least on said combination of the two difference signals.

6. A disk drive comprising:

a base, a data storage disk rotating relative to the base, an actuator structure for positioning a data transducer head at radial locations of a data storage surface of the disk, the data transducer head including a magnetoresistive read element for generating a head readback signal, the disk defining a multiplicity of concentric data tracks, and a pattern of servo sectors embedded within the tracks, a servo sector including a repeating pattern of servo bursts, and a head position servo loop system responsive to the read element for determining head position by reading relative amplitudes of the repeating pattern of servo bursts, the servo loop system including a controller adapted for selecting a plurality of the servo bursts to obtain combinations of the burst amplitudes of the selected servo bursts as a function of weighting factors that vary based on target position, and generating a substantially continuous position error signal (C_PES) based on said combinations of the burst amplitudes, indicating radial position of the read head relative to a target position.

7. The disk drive of claim 6, wherein the controller selects at least two pairs of servo bursts, and for each selected pair of servo bursts obtains at least one combination of the burst amplitudes of the selected servo burst pair as a function of said weighting factors.

8. The disk drive of claim 7, wherein the controller selects each pair of servo bursts in accordance with predetermined burst phase switch points fixed in relation to radial position of the read head relative to a track.

9. The disk drive of claim 8, wherein the controller obtains said combination of the amplitudes of each servo burst pair by differencing relative amplitudes of the servo burst pair to generate a difference signal for each servo burst pair, thereby generating at least: (1) a first difference signal and (2) a second difference signal.

10. The disk drive of claim 9, wherein the controller generates the C_PES signal by obtaining a combination of at least the first and the second difference signals as a function of said weighting factors, wherein the C_PES signal is based at least on said combination of the two difference signals.

11. A servo control system that positions a magnetic head relative to multiple tracks of a magnetic storage medium, the system comprising:

a head assembly including at least one read head for reading a pattern of servo sectors embedded within the tracks, a servo sector including a repeating pattern of servo bursts, and for generating a head readback signal;

a head position servo loop system responsive to the readback head signal for determining head position by reading relative amplitudes of the repeating pattern of servo bursts, the servo loop system including a demodulation controller adapted for selecting a plurality of the servo bursts to obtain combinations of the burst amplitudes of the selected servo bursts as a function of weighting factors that vary based on target position, and generating a substantially continuous position error signal (C_PES) based on said combinations of the burst amplitudes, indicating radial position of the read head relative to a target position;

an actuator structure that is activated to position the head assembly relative to target tracks; and a servo control responsive to at least the C_PES signal for controlling the actuator structure to position and maintain the read head at target tracks.

12. The system of claim 11, wherein the controller selects at least two pairs of servo bursts, and for each selected pair of servo bursts obtains at least one combination of the burst amplitudes of the selected servo burst pair as a function of said weighting factors.

13. The system of claim 12, wherein the controller selects each pair of servo bursts in accordance with predetermined burst phase switch points fixed in relation to radial position of the read head relative to a track.

14. The system of claim 13, wherein the controller obtains said combination of the amplitudes of each servo burst pair by differencing relative amplitudes of the servo burst pair to generate a difference signal for each servo burst pair, thereby generating at least: (1) a first difference signal and (2) a second difference signal.

15. The system of claim 14, wherein the controller generates the C_PES signal by obtaining a combination of at least the first and the second difference signals as a function of said weighting factors, wherein the C_PES signal is based at least on said combination of the two difference signals.

16. A method for generating a position error signal in a disk drive including a magnetic data storage disk rotating relative to a base, a data transducer assembly positioned at concentric data tracks by a rotary actuator referenced to the base and controlled by a digital servo system, the data transducer assembly having a magnetoresistive (MR) read element, the digital servo system employing multiple servo bursts in servo sectors embedded within the data tracks, the method comprising steps of:

during at least one of servo track positioning or following for each target head position relative to one or more tracks:

reading the servo bursts as the tracks pass under read element;

measuring burst amplitudes of the servo bursts;

selecting at least two pairs of servo bursts in accordance with predetermined burst phase switch points fixed in relation to radial position of the read head relative to a track;

for each selected pair of servo bursts obtaining at least one combination of the burst amplitudes of the selected servo burst pair, by differencing relative amplitudes of the servo burst pair to obtain a difference signal for each servo burst pair, thereby generating at least a first difference signal and a second difference signal; and generating a substantially continuous position error signal (C_PES) based on a signal PES_P that is a function of the two difference signals, wherein:

PES_P=(first difference signal)* cos(X)+(second difference signal)* sin(X), wherein X=(target position)*pi.

17. The method of claim 16, wherein the step of generating the C_PES signal includes the steps of generating a signal PES_Q as a function of the two difference signals, such that the C_PES signal is based at least on the PES_Q signal, wherein:

PES_Q=(second difference signal)* cos(X)−(first difference signal)* sin(X).

18. The method of claim 17, further including the steps of selecting one of the PES_P and PES_Q signals based on the distance between the head and the target position, to determine the C_PES signal.

19. The method of claim 17, wherein the steps of selecting one of the PES_P and PES_Q signals to determine the C_PES signal includes the steps of:

determining if PES_P>PES_Q, then if PES_P>−PES_Q then selecting PES_Q otherwise selecting PES_P;

otherwise determining if PES_P<=PES_Q, then if PES_P>−PES_Q then selecting −PES_P otherwise selecting −PES_Q.

20. The method of claim 19, wherein the steps of generating the C_PES signal includes the steps of: combining head position servo track number and selected signals PES_P or PES_Q to generate the C_PES signal.

21. The method of claim 17, wherein the steps of generating the C_PES signal further includes the steps of:

(a) selecting one of the PES_P and PES_Q signals to determine the position error signal C_PES, including the steps of:

determining if PES_P>PES_Q, then if PES_P>−PES_Q then PesRamp=PES_Q and Offset=+½ track width, otherwise PesRamp=PES_P and Offset=0, otherwise determining if PES_P<=PES_Q, then if PES_P>−PES_Q then PesRamp=−PES_P and Offset+1 track, otherwise PesRamp=−PES_Q and Offset=−½ track width; and (b) using the values PesRamp and Offset to generate the C_PES signal, wherein:

C_PES=2*round((TrackNumber−(TargetPosition+Fraction))/2)+Fraction−TargetPosition;

where: Fraction=Offset+slopeGain*PesRamp, slopeGain comprises burst signal gain, and
TrackNumber comprises servo track number.

22. A disk drive comprising:

a base, a data storage disk rotating relative to the base, an actuator structure for positioning a data transducer head at radial locations of a data storage surface of the disk, the data transducer head including a magnetoresistive read element for generating a head readback signal, the disk defining a multiplicity of concentric data tracks, and a pattern of servo sectors embedded within the tracks, a servo sector including a repeating pattern of servo bursts, and a head position servo loop system responsive to the read element for determining head position by reading relative amplitudes of the repeating pattern of servo bursts, the servo loop system including a controller;

wherein the controller selects at least two pairs of servo bursts in accordance with predetermined burst phase switch points fixed in relation to radial position of the read head relative to a track, and for each selected pair of servo bursts obtains at least one combination of the burst amplitudes of the selected servo burst pair, by differencing relative amplitudes of the servo burst pair to obtain a difference signal for each servo burst pair, thereby generating at least a first difference signal and a second difference signal, and further generates a substantially continuous position error signal (C_PES) based on a signal PES_P that is a function of the two difference signals, wherein:

PES_P=(first difference signal)* cos(X)+(second difference signal)* sin(X), wherein X=(target position)*pi.

23. The disk drive of claim 22, wherein the controller generates a signal PES_Q as a function of at least the two difference signals, such that the C_PES signal is based at least on the PES_Q signal, wherein:

PES_Q=(second difference signal)* cos(X)−(first difference signal)* sin(X).

24. The disk drive of claim 23, wherein the controller generates the C_PES signal by selecting one of the PES_P and PES_Q signals based on the distance between the head and the target position.

25. The disk drive of claim 23, wherein the controller generates the C_PES signal based on a selection of one of the PES_P and PES_Q signals, the controller including a selector adapted for:
   determining if PES_P>PES_Q,
      then if PES_P>−PES_Q then selecting PES_Q, otherwise selecting PES_P;
   otherwise determining if PES_P<=PES_Q,
      then if PES_P>−PES_Q then selecting −PES_P, otherwise selecting −PES_Q.

26. The disk drive of claim 25, wherein the controller generates the C_PES signal by combining a head position servo track number and one of the selected signals PES_P or PES_Q.

27. The disk drive of claim 23, wherein the controller includes:
   (a) a selector adapted for selecting one of the PES_P and PES_Q signals by:
      determining if PES_P>PES_Q,
         then if PES_P>−PES_Q then PesRamp=PES_Q and Offset+½ track width, otherwise PesRamp=PES_P and Offset=0,
      otherwise determining if PES_P<=PES_Q, then if PES_P>−PES_Q then PesRamp=−PES_P and Offset=+1 track, otherwise PesRamp=−PES_Q and Offset=−½ track width; and
   (b) a processor adapted for generating the C_PES signal using the PesRamp and Offset values, according to the relation:

C_PES=2*round((TrackNumber−(TargetPosition+Fraction))/2)+Fraction;

where: Fraction=Offset+slopeGain*PesRamp, slopeGain comprises burst signal gain, and
   TrackNumber comprises servo track number.

28. A servo control system that positions a magnetic head relative to multiple tracks of a magnetic storage medium, the system comprising:
   a head assembly including at least one read head for reading a pattern of servo sectors embedded within the tracks, a servo sector including a repeating pattern of servo bursts, and for generating a head readback signal;
   a head position servo loop system responsive to the readback head signal for determining head position by reading relative amplitudes of the repeating pattern of servo bursts, the servo loop system including a demodulation controller;
   wherein the controller selects at least two pairs of servo bursts in accordance with predetermined burst phase switch points fixed in relation to radial position of the read head relative to a track, and for each selected pair of servo bursts obtains at least one combination of the burst amplitudes of the selected servo burst pair, by differencing relative amplitudes of the servo burst pair to obtain a difference signal for each servo burst pair, thereby generating at least a first difference signal and a second difference signal, and further generates a substantially continuous position error signal (C_PES) based on a signal PES_P that is a function of the two difference signals, wherein:

PES_P=(first difference signal)* cos(X)+(second difference signal)* sin(X), wherein X=(target position)*pi;

an actuator structure that is activated to position the head assembly relative to target tracks; and
   a servo control responsive to at least the C_PES signal for controlling the actuator structure to position and maintain the read head at target tracks.

29. The system of claim 28, wherein the controller generates a signal PES_Q as a function of at least the two difference signals, such that the C_PES signal is based at least on the PES_Q signal, wherein:

PES_Q=(second difference signal)* cos(X)−(first difference signal)* sin(X).

30. The system of claim 29, wherein the controller generates the C_PES signal by selecting one of the PES_P and PES_Q signals based on the distance between the head and the target position.

31. The system of claim 29, wherein the controller generates the C_PES signal based on a selection of one of the PES_P and PES_Q signals, the controller including a selector adapted for:
   determining if PES_P>PES_Q,
      then if PES_P>−PES_Q then selecting PES_Q, otherwise selecting PES_P;
   otherwise determining if PES_P<=PES_Q,
      then if PES_P>−PES_Q then selecting −PES_P, otherwise selecting −PES_Q.

32. The system of claim 31, wherein the controller generates the C_PES signal by combining a head position servo track number and one of the selected signals PES_P or PES_Q.

33. The system of claim 29, wherein the controller includes:
   (a) a selector adapted for selecting one of the PES_P and PES_Q signals by:
      determining if PES_P>PES_Q,
         then if PES_P>−PES_Q then PesRamp=PES_Q and Offset=+½ track width, otherwise PesRamp=PES_P and Offset=0,
      otherwise determining if PES_P<=PES_Q, then if PES_P>−PES_Q then PesRamp=−PES_P and Offset=+1 track, otherwise PesRamp=−PES_Q and Offset=−½ track width; and
   (b) a processor adapted for generating the C_PES signal using the PesRamp and Offset values, according to the relation:

C_PES=2*round((TrackNumber−(TargetPosition+Fraction))/2)+Fraction−TargetPosition;

where: Fraction=Offset+slopeGain*PesRamp, slopeGain comprises burst signal gain, and
   TrackNumber comprises servo track number.

* * * * *